US008417712B2

(12) United States Patent
Narayanan et al.

(10) Patent No.: US 8,417,712 B2
(45) Date of Patent: Apr. 9, 2013

(54) IMAGE QUERYING WITH RELEVANCE-RELATIVE SCALING

(75) Inventors: Raman Narayanan, Kirkland, WA (US); George Moromisato, Seattle, WA (US); Radoslav Nickolov, Bellevue, WA (US); Raymond Ozzie, Seattle, WA (US); Jack Ozzie, North Bend, WA (US); Matt Augustine, Seattle, WA (US); Ming Liu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 12/107,081

(22) Filed: Apr. 22, 2008

(65) Prior Publication Data
US 2009/0265334 A1    Oct. 22, 2009

(51) Int. Cl.
G06F 7/00   (2006.01)
G06F 17/30   (2006.01)

(52) U.S. Cl.
USPC ......................................... 707/749; 707/772

(58) Field of Classification Search .................. 707/772, 707/749
See application file for complete search history.

(56) References Cited

U.S. PATENT DOCUMENTS

| 4,574,395 | A | * | 3/1986 | Kato .............................. 382/306 |
| 4,716,404 | A | * | 12/1987 | Tabata et al. ................... 345/625 |
| 5,515,488 | A | * | 5/1996 | Hoppe et al. .................... 345/440 |
| 5,751,286 | A | * | 5/1998 | Barber et al. ................... 715/835 |
| 5,796,395 | A | * | 8/1998 | de Hond ........................ 715/751 |
| 5,886,698 | A | | 3/1999 | Sciammarella et al. |
| 5,982,369 | A | * | 11/1999 | Sciammarella et al. ...... 715/835 |
| 6,353,823 | B1 | * | 3/2002 | Kumar .................... 707/999.003 |
| 6,415,282 | B1 | * | 7/2002 | Mukherjea et al. ............ 707/737 |
| 6,590,586 | B1 | | 7/2003 | Swenton-Wall et al. |
| 6,915,294 | B1 | * | 7/2005 | Singh et al. ............ 707/999.003 |
| 7,152,061 | B2 | * | 12/2006 | Curtis et al. ........... 707/999.003 |
| 7,519,469 | B2 | * | 4/2009 | de Silva et al. ................ 701/200 |
| 7,599,988 | B2 | * | 10/2009 | Frank ............................. 709/203 |
| 7,716,218 | B1 | * | 5/2010 | Pogue ........................... 707/728 |
| 2001/0034740 | A1 | | 10/2001 | Kerne |
| 2005/0116966 | A1 | | 6/2005 | Graham et al. |
| 2005/0125374 | A1 | * | 6/2005 | Curtis et al. ....................... 707/1 |
| 2006/0106764 | A1 | | 5/2006 | Girgensohn et al. |
| 2006/0204142 | A1 | | 9/2006 | West et al. |

(Continued)

OTHER PUBLICATIONS

Uppal, "Yahoo Image Search Collage Generator v1.0", Release Date: Mar. 2, 2005, http://www.programmersheaven.com/download/38981/download.aspx.

(Continued)

Primary Examiner — James Trujillo
Assistant Examiner — Pavan Mamillapalli
(74) Attorney, Agent, or Firm — Microsoft Corporation

(57) ABSTRACT

Queries may be issued against an image store to produce a set of image instance relating to images in the image store that relate to the query. The relevance of the images to the query may be depicted by scaling the image instances according to the predicted relevance of the image to the query. The image instances may be further positioned within the image instance set query result, e.g., by clustering according to image relatedness or by similar predicted relevance of the images to the query terms of the query. The image instances may also be presented as smoothly zoomable images, such that the user may zoom in on the images in an efficient manner that facilitates realtime, gradual zooming with reduced resampling inefficiency.

20 Claims, 9 Drawing Sheets

U.S. PATENT DOCUMENTS

| | | | |
|---|---|---|---|
| 2006/0224993 | A1 | 10/2006 | Wong et al. |
| 2007/0263007 | A1 | 11/2007 | Robotham et al. |
| 2007/0266025 | A1* | 11/2007 | Wagner et al. .................. 707/7 |
| 2008/0300872 | A1* | 12/2008 | Basu et al. ................... 704/235 |

OTHER PUBLICATIONS

Ng, et al., "Collages as Dynamic Summaries of Mined Video Content for Intelligent Multimedia Knowledge Management", AAAI Spring Symposium Series on Intelligent Multimedia Knowledge Management, 2003, 10 Pages.

Bederson, "Quantum Treemaps and Bubblemaps for a Zoomable Image Browser", ACM Conference on User Interface and Software Technology (UIST 2001), Dated: May 2001, pp. 71-80.

Combs, et al., "Does Zooming Improve Image Browsing?", HCIL Technical Report No. 99-05 (Feb. 1999), 10 Pages.

* cited by examiner

IMAGE QUERYING WITH RELEVANCE-RELATIVE SCALING

BACKGROUND

Many computing scenarios involve a query that results in a set of related images. For example, a user may query an image store for images matching a certain keyword or having a certain property; or a user may query a data store, such as a database of people, where data store records are associated with images, such as portrait images of the selected individuals. In these scenarios, the results are often presented as a set of image instances (e.g., as a set of thumbnail images). Moreover, the image instances are sometimes presented in a manner that permits the user to select an image instance in order to view the result associated with the image instance (e.g., a full-size image, or the data store record associated with an image instance.)

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The images selected in response to a query may be presented in a manner that signifies the relevance of the selected images to the query. For example, the relevance of respective images to the query may be predicted (e.g., through a variety of relevance-based calculations), and in the image set provided in response to the query, a first image may be presented in a more significant manner than a second image that is predicted to be less relevant. The significance may be denoted by the position of the image instance in the image instance set; e.g., the first image instance may be presented before the second, less relevant image instance, such as by presenting the first image instance above or to the left of the second image instance in an image instance series of descending relevance.

An alternative technique for indicating significance is by scaling the image instances of respective images in relation to the significance of the image. For example, a first image may be presented with a larger image instance as compared with a second image that is predicted to be less relevant to the query. The image instances may therefore be relatively sized in the image set to denote predicted relevance, such that the result set is visibly scaled to suggest more heavily the results that are likely to be more relevant to the query. This scaling may be utilized in combination with relevance-based positioning (e.g., by denoting more relevant results with both larger image instances and earlier result placement as compared with less relevant results), or in place of relevance-based positioning, such that the result images may be positioned in the result set either arbitrarily or based on other criteria.

Relevance-relative scaling of image instances may be utilized where the images are smoothly zoomable. However, in some undesirable computing scenarios, an image may be presented at a zoom level with a reduced amount of information in the image, and a lower resulting image quality, than may be achieved if the image is computed in a different manner. For example, if a user zooms in on a small image instance with comparatively little information, the resulting zoomed-in image may appear pixilated or blocky where image information has been lost, despite the availability of such information in the full-size image. However, in other computing scenarios, this disadvantage may be ameliorated by storing the image in a manner that permits a retrieval of image information suitable for any zoom level. Moreover, the image may be stored in a manner that permits a rapid retrieval of such information, which may facilitate real-time, smooth zooming of the image. This technique may be adapted to image instance scaling for image querying, such as by presenting query results as a set of smoothly zoomable image instances. Moreover, the zoom level of respective image instances in the result set may be selected such that the image instances are relatively scaled to denote the predicted relevance of the images to the query.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
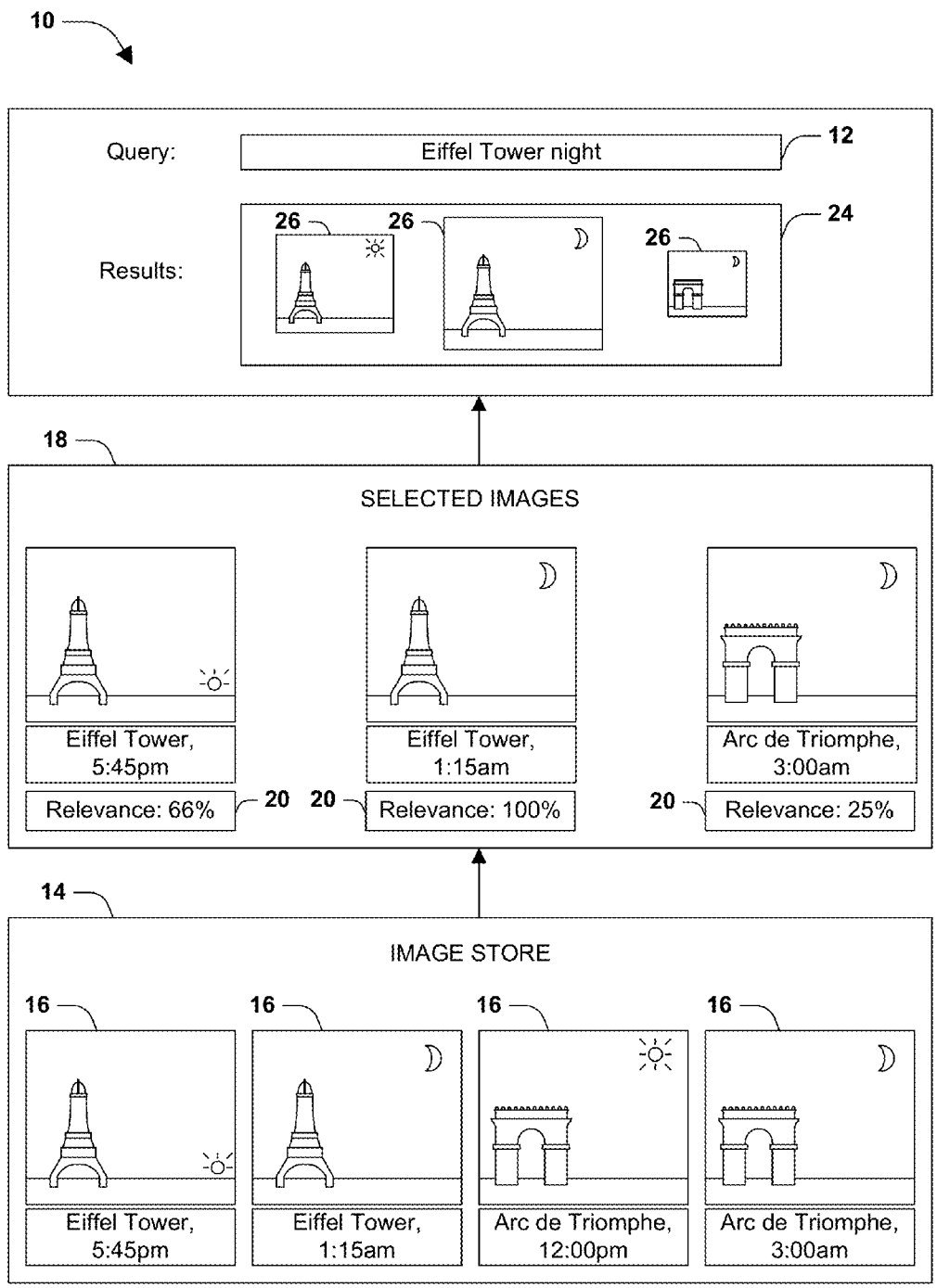
FIG. 1 is an exemplary illustration of relevance-relative scaling of image instances with respect to a query evaluated against an image store.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In many computing scenarios, a query may be issued against a data set that results in a set of images. As a first example, the data set may comprise a set of images that are respectively associated with one or more keywords (e.g., "Eiffel Tower" and "my friend Kathryn") and have one or more properties (e.g., black-and-white, 1024×768 resolution, and landscape orientation), and the query may specify aspects of desired photos (e.g., "black-and-white photos of the Eiffel Tower.") As a second example, the data set may comprise records representing any type of data, wherein the records are associated with certain images (e.g., a "Contacts" database comprising logistic information about various people, where certain records are associated with an image of the represented person), and a query for a particular person or group of people may generate a response including the associated images (e.g., portrait images of people selected in response to the query.) The images stored in the data store are often too large to be conveniently presented in full resolution in the result set, so scaled-down image instances may be generated to include smaller representations of the images in the presented query result.

In addition, the results of a query may be arranged to indicate the predicted relevance of the results to the query result. For example, a query issued against a Contacts data store for people named "Kathy Smith" may produce results such as "Kathryn Smith", "Kathy Simon," and "Katie Sullivan." Respective query results may include a predicted relevance with respect to the query according to various statistical and/or heuristic metrics; e.g., these three individuals may have a predicted relevance based on the textual similarity to the queried name. Moreover, the query results may be ordered in the result set with respect to the predicted relevance of the results, such that more relevant results are more strongly suggested than less relevant results. For example, the results may be presented in a sequence of descending relevance, with more relevant query results presented before less relevant query results. Accordingly, where the query results include image instances, the image instances included in the query result set may be arranged according to the predicted relevance of the respective query results associated with different images.

In view of these scenarios, a technique may be devised for presenting the images of a query result set in relation to the predicted relevance of respective images. This technique involves scaling respective images in the result set proportionally to respect to the predicted relevance of the image (and/or its associated data record, such as an individual pictured in the image) to the query. Thus, the size of an image instance may denote its relevance to the query. This scaling may be predominantly based on the query result relevance metric, or may also be related to other factors, such as the relevance of the image as compared with the relevance of other images in the result set. For example, the scaling may be adjusted such that the image with the highest query relevance score in the result set is presented with predefined large image instance dimensions, and other image instances in the query result set are accordingly scaled to diminished dimensions based on the proportionate relevance with respect to the highest-scoring image. By scaling the image instances of an image result set based on the predicted relevance with respect to the query, the result set may manifest an advantageous weighting of suggested results in an easily understandable, visible indicator of relevance.

FIG. 1 illustrates an exemplary scenario 10 involving an application of this technique. The exemplary scenario 10 involves a query 12 against an image store 14, where the query requests images of the Eiffel Tower at night. The image store 14 comprises images 16 of various landmarks (including the Eiffel Tower and the Arc de Triomphe) at different times of day, which may be correlated with daytime and nighttime. The query 12 may be evaluated against the images 16 in the image store 14 to identify selected images 18 that are at least somewhat related to the query (e.g., the image of the Arc de Triomphe at 12:00 pm may be excluded due to a 0% relationship with the query.) The selected images 18 may then be assigned a query relevance score 20 denoting the relevance of the selected image 18 to the query 12. This evaluation may be performed according to many statistical and/or heuristic techniques. The selected images 18 may then be scaled to produce respective image instances 26 of the images, such that the image instances 26 may be conveniently displayed together in response to the query 12 (e.g., without consuming an excessive amount of display space, as may be consumed by displaying full-size versions of all selected images 18.) Moreover, the scaling of the image instances 26 may be proportional to the query relevance score 20 of the images; e.g., the "Eiffel Tower, 1:15 am" image with 100% predicted relevance may be presented as a large image instance, the "Eiffel Tower, 5:45 pm" image with 66% predicted relevance may be presented as a medium-size image instance, and the "Arc de Triomphe, 3:00 am" image with 25% predicted relevance may be presented as a small image instance. Accordingly, the image instances 26 may be assembled into an image instance set 24, which may be presented in response to the query 12. In this manner, the scaling of the image instances 26 provides a visible indicator of the proportional relevance of the selected images 16.

Figure 2:
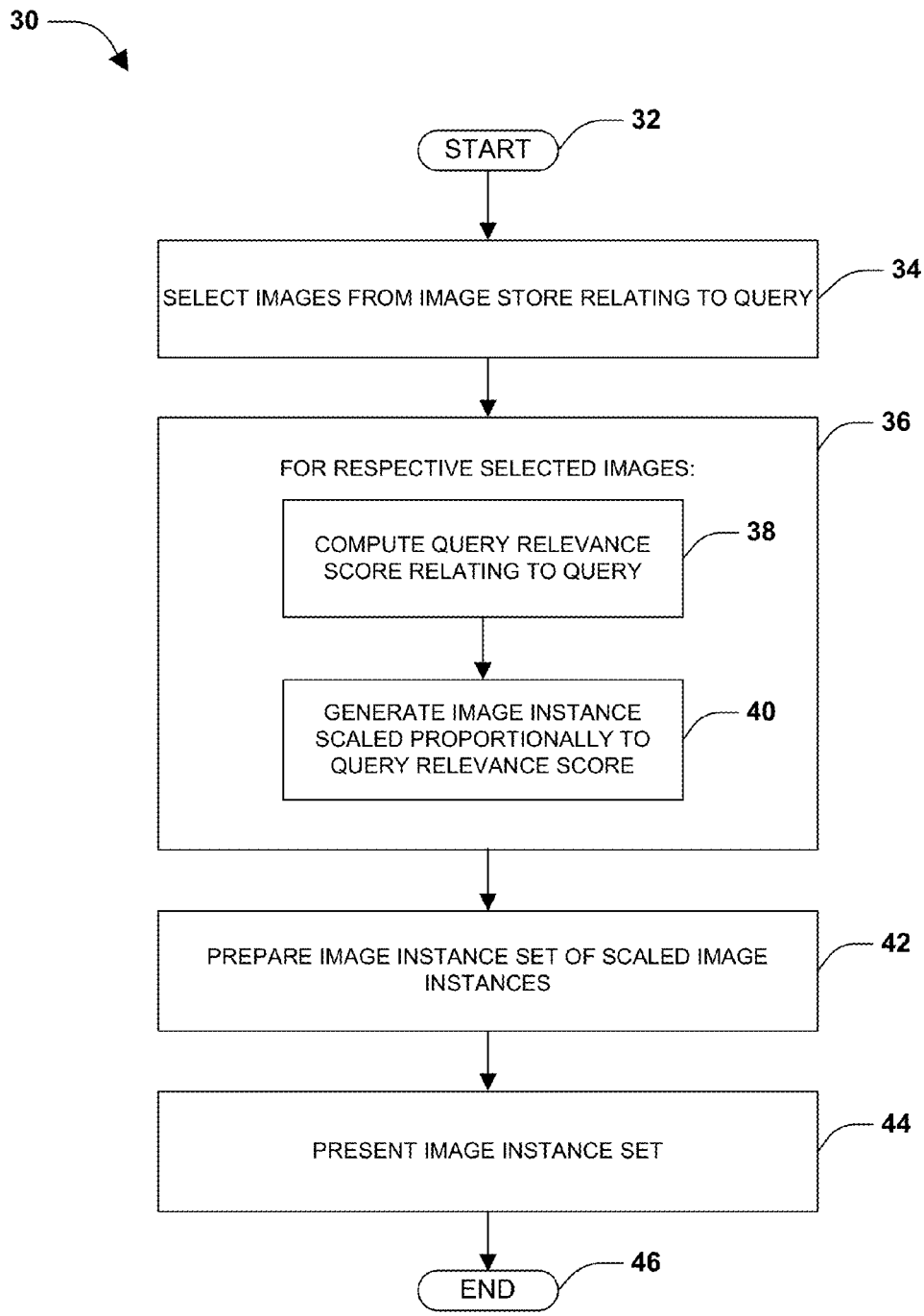
FIG. 2 is a flow chart illustrating an exemplary method of presenting images selected from an image store in response to a query.

FIG. 2 illustrates a first exemplary embodiment of this technique, comprising an exemplary method 30 of presenting images selected from an image store in response to a query. The exemplary method 30 begins at 32 and involves selecting 34 images from the image store relating to the query. The exemplary method 30 also involves producing 36 image instances for respective selected images, wherein such producing 36 involves computing 38 a query relevance score relating to the query and generating 40 an image instance scaled proportionally to the query relevance score. The exemplary method 30 also involves preparing 42 an image instance set of scaled image instances, and presenting 44 the image instance set. By preparing 42 and presenting 44 an image instance set scaled according to the computed query relevance score of the images with respect to the query, the exemplary method 30 thereby achieved a relevance-relative scaling of the image results with respect to the query, and so ends at 46.

Figure 3:
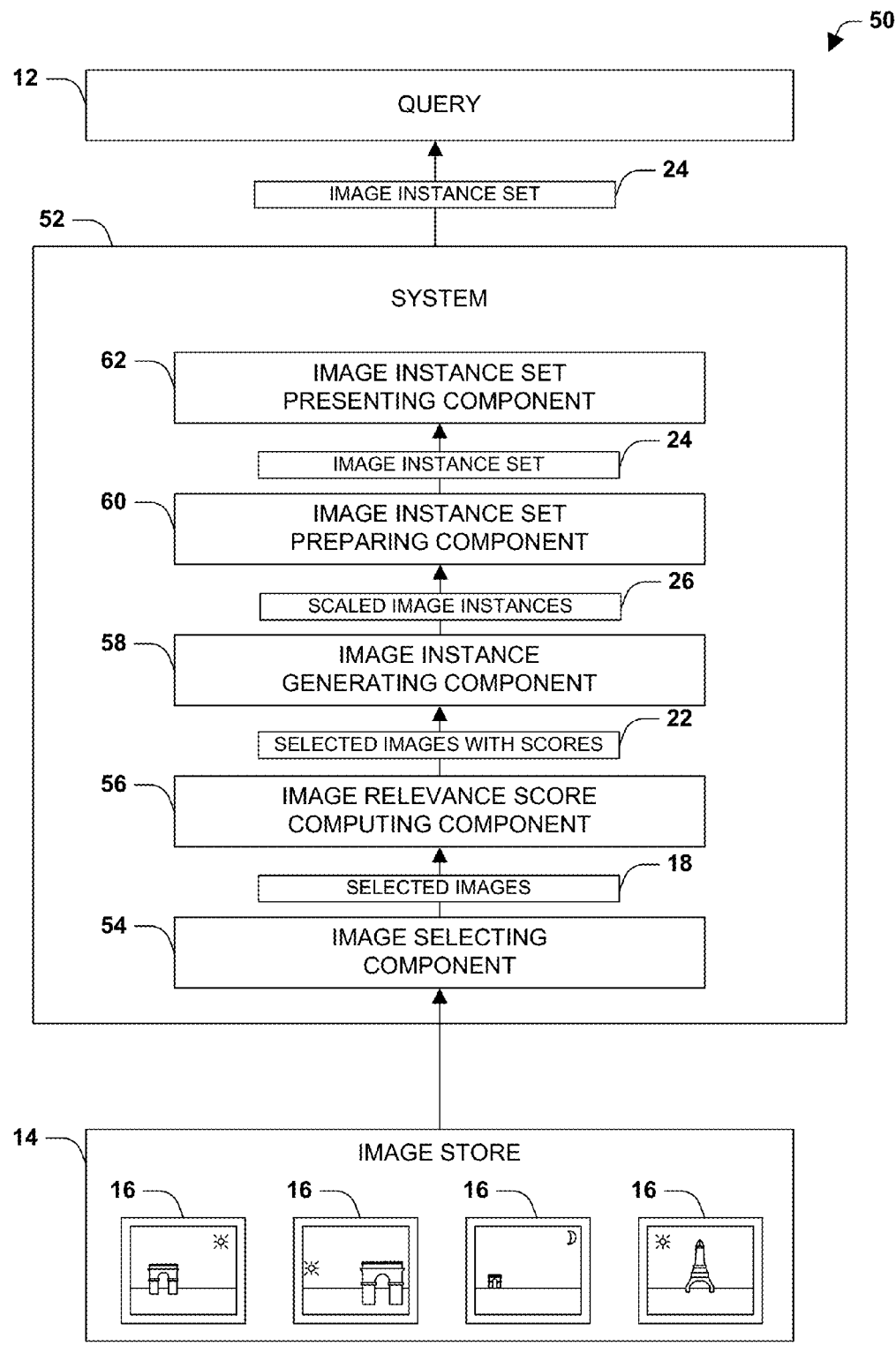
FIG. 3 is a component block diagram illustrating an exemplary system for presenting images selected from an image store in response to a query.

FIG. 3 illustrates a second exemplary embodiment of this technique, illustrated in a scenario 50 involving a query 12 applied against an image store 14 to retrieve and display any images 16 matching certain query criteria. The scenario 50 illustrates an exemplary system 52 for presenting images 16 selected from the image store 14 in response to the query 12, wherein the images 16 are presented as an image instance set 24 comprising image instances 24 that are proportionally scaled according to the relevance of the images 16 with respect to the query 12. The exemplary system 52 comprises an image selecting component 54, which is configured to select images 16 from the image store 14 relating to the query 12. The image selecting component 54 produces a set of selected images 18. The exemplary system 52 also comprises an image query relevance score computing component 56, which is configured, for respective selected images 18, to compute a query relevance score 22 relating to the query 12. The exemplary system 52 also comprises an image instance generating component 58, configured, for respective selected images 18, to generate an image instance 26 of the image 16 scaled proportionally to the query relevance score 22 of the image 16. The exemplary system 52 also comprises a image instance set preparing component 60, which is configured to prepare an image instance set 24 of the image instances 26 generated by the image instance generating component 58. The exemplary system 52 also comprises an image instance set presenting component 62, which is configured to present the image instance set 24 prepared by the image instance set preparing component 60 in response to the query 12. By preparing and providing in response to the query 12 an image instance set 24 comprising image instances 22 scaled according to the query relevance score 22 of the images 22 with respect to the query 12, the exemplary system 52 thereby presents the images 16 in response to the query 12 with a visible indicator of relevance.

The techniques discussed herein may be implemented with variations in many aspects, and some variations may present additional advantages and/or mitigate disadvantages with respect to other variations of these and other techniques. These aspects and variations thereof may be applied within various embodiments of these techniques, such as (e.g.) the exemplary method 30 of FIG. 2 and the exemplary system 52 of FIG. 3. Moreover, some variations may be compatibly implemented in combination with other variations, either synergistically or in parallel, to yield additional advantages and/or mitigated disadvantages.

A first aspect that may vary among implementations of these techniques relates to the computation of relevance of an image with respect to a query. It may be appreciated that the relevance computation may positively or negatively rely on many factors, such as (e.g.) properties of the image, such as its dimensions, format, colors, contrast, and brightness; metadata associated with the image, such as the date of the image, the creator of the image, and keywords associated with the image; and the contents of the query, such as the query terms, arrangement or Boolean grouping thereof, and the preferences of a user on whose behalf the query is evaluated. It may also be appreciated that many types of relevance computations may be applied to such factors, which may be based on statistical analyses, heuristics, artificial intelligence algorithms, etc. For example, a string comparison of a query term (e.g., "Kathryn Smith") with an image keyword (e.g., "Kathryn Simon") may involve a Boolean equivalence comparison, a simple character-counting statistical analysis, a substring-length-based statistical analysis (e.g., counting matching characters in a row match), and/or various heuristics (e.g., waiting an identical last name more heavily than an identical first name.) Such queries may also specify details about various images that may be evaluated according to sophisticated image evaluation techniques, such as artificial vision techniques; for example, a query may specify "two cats," and an image processing technique may attempt to analyze the images in the image store to identify and count cat-like shapes in the images. Those of ordinary skill in the art may be able to select and/or devise many query analysis and/or image-processing techniques while embodying a query relevance computation as discussed herein.

A particular variation of this first aspect that may be advantageous for these techniques relates to a query relevance score computation based on a query term parsing of the query, and based on a preassigned query term relevance score, which is assigned to the images with respect to relevant query terms. In this variation, the query comprises at least one query term, and for respective images, the query relevance score may be computed by combining the query term relevance scores of respective query terms of the query relating to the image. The combining may be computed in various ways (e.g., summation, mean average, median average, mode average, weighting based on the ordering of query terms, etc.), with an end result of a query relevance score computed for the images on a per-query-term basis.

Figure 4:
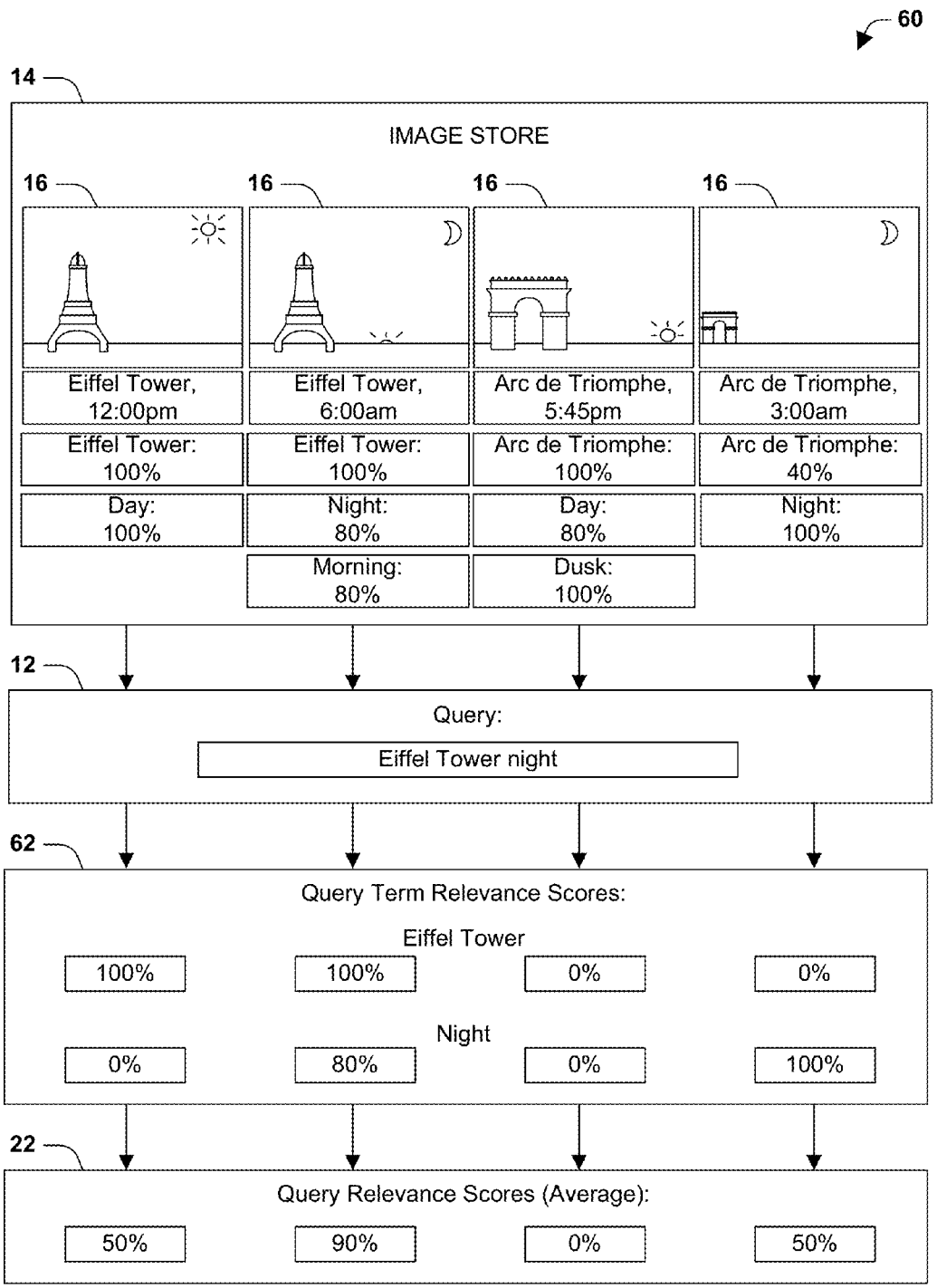
FIG. 4 is an exemplary illustration of relevance-relative scaling of image instances with respect to query terms comprising a query evaluated against an image store.

FIG. 4 illustrates an exemplary scenario 60 involving a per-query-term relevance score computation. In this exemplary scenario 60, respective images 16 in the image store 14 are associated with keywords, such as the subject of the image and "day," "dusk," "night," and "morning," based on the time of day illustrated in the image. Moreover, in this exemplary scenario 60, the keywords have a fuzzy relationship with respect to the keywords, such that the query relevance scores may vary between 0% and 100% with respect to the relevance of the keyword to the image. As a first example, an image with the Arc de Triomphe in the background may be only partially associated (e.g., with a 40% query term relevance score) with the query term "Arc de Triomphe." As a second example, the image of the Eiffel Tower at 6:00 am is fully relevant to the keyword "Eiffel Tower," and is heavily but not fully relevant to both "morning" and "night" keywords. As a result, the query term relevance scores 62 for a query 12 requesting images of the Eiffel Tower at night may be computed with respect to the fuzzy relationships of the images with keywords, and the mean average of the query relevance scores of the images with respect to respective query terms may be computed. As a result, the query relevance scores 22 indicate that the image of the Eiffel Tower at dawn is the closest match to the query 12, while the images of the Arc de Triomphe at night and of the Eiffel Tower at noon are only somewhat relevant to the query.

An additional variation of this aspect relates to the adjustment of the query term relevance scores associated with an image in the image store according to a user selection. In some scenarios, the image instances presented as a query result may be selectable by a user; for example, the user may indicate a desire to view a full-size version of an image by clicking on its image instance. The user selection may be construed as an affirmation by the user that the image may be relevant to the query, and in particular to the query terms comprising the query. Accordingly, the query term relevance scores relating the selected image to the query terms of the query may be somewhat increased to denote the positive correlation. Conversely, if the user declines to select a first image instance and instead selects a second image instance, this user selection may be construed as a possible denial of the relevance of the image to the query terms. Accordingly, when an image instance is selected, the query term relevance scores relating the non-selected images to the query terms may be adjusted slightly downward. Accordingly, in some embodiments of these techniques, upon detecting a user selection of a selected image instance in the image instance set, at least one query term relevance score in the image store relating the selected image instance to at least one query term may be adjusted in response to the user selection. In this manner, the query term relevance scores may be adjusted in response to user selections to yield better predictions of image relevance in response to future queries.

A second aspect that may vary among implementations of these techniques relates to the generating of scaled image instances based on the computed query relevance scores. In a first variation, the scaled image instances may be generated on the fly in response to the query; e.g., if an image is computed to have a query relevance of 59%, it may be scaled down 59% (and preferably to an equivalent extent all dimensions, so as to maintain the aspect ratio of the image) and included in the prepared image instance set. The scaling may also be adjusted (e.g., to generate image instances within a desired scaling range). For example, it may be desirable to present image instances no smaller than 50%, so a scaling adjustment factor may be applied to produce proportionate scaling within the range of 50% to 100% (wherein a 50% relevance score results in a 75%-scaled image instance, a 75% relevance score results in an 87.5%-scaled image instance, etc.) However, this "on-the-fly" scaling may be computationally intensive, particularly for a computer system servicing a large volume of queries and/or including a large number of image instances in an image set. Moreover, this variation may be inefficient in view of a repeated scaling of an image to the same or a similar extent, e.g., repeatedly scaling down an image to 50% in response to a popular query. This inefficiency may be somewhat mitigated with a scaled image instance cache, but this mitigation involves an additional complexity and additional memory storage. In a second variation, the image store may comprise, for respective images, a scaled image instance series, e.g., a set series of image instances scaled to 20%, 40%, 60%, and 80%. When a query relevance score is computed for the image, a scaled image instance may be selected from the scaled image instance series in the image store that is scaled proportionally (or approximately proportionately) with respect to the query relevance score of the image.

A third variation of this aspect relates to techniques involving smoothly zoomable images. This variation may relate to the computational burden of storing and scaling the image, to the presentation and quality of the images included in the query result, and to the user experience while interacting with the image instances in the query result.

Figure 5:
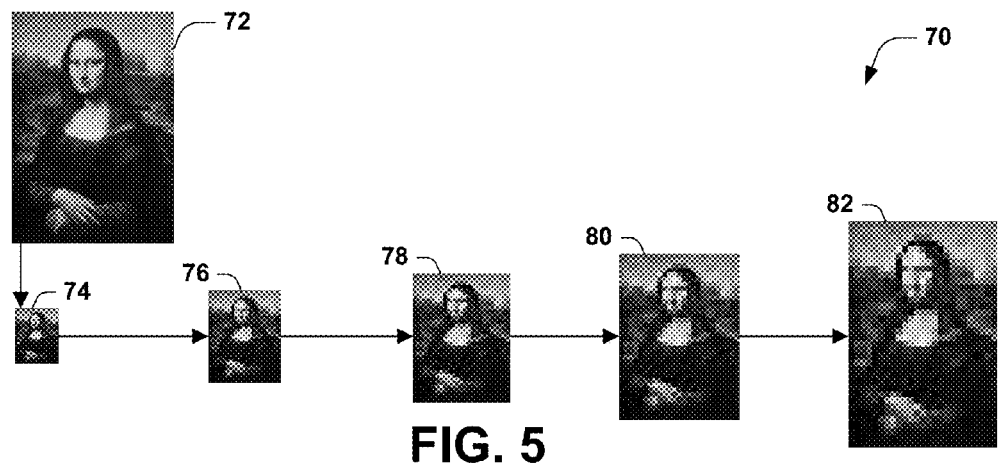
FIG. 5 is an illustration of an image sampling problem involving up-sampling of down-sampled images.

It may be appreciated that images of various resolutions contain different amounts of image data, and accordingly present different amounts of image information. It may also be appreciated that the scaling of images may provide a reduction of image quality, particularly where an image is scaled up from a lower resolution. FIG. 5 illustrates one example 70, wherein an original full-size image 72 is scaled down to a small version useful as a small image instance 74. The down-scaling of the image reduces the amount of information in the small image instance 74 and reduces the image information provided thereby, but may be adequate for use as an image instance. However, if the user wishes to zoom in on the small image instance 74 to a medium-size image, the computer system servicing the user (such as a web browser on a client machine, through which the query was issued to an image querying system and to which the query result was presented) may not have access to the image information that might be included in a medium-size image, but that is not present in the small image instance. Accordingly, a medium-size image 78 generated by zooming in on and up-scaling the small image instance 74 is presented in a pixilated and blocky appearance with a reduced image quality. The reduced image quality becomes more apparent with greater up-scaling, such that the full-size image 82 is of markedly lower quality with respect to the original full-size image 72.

Figure 6:
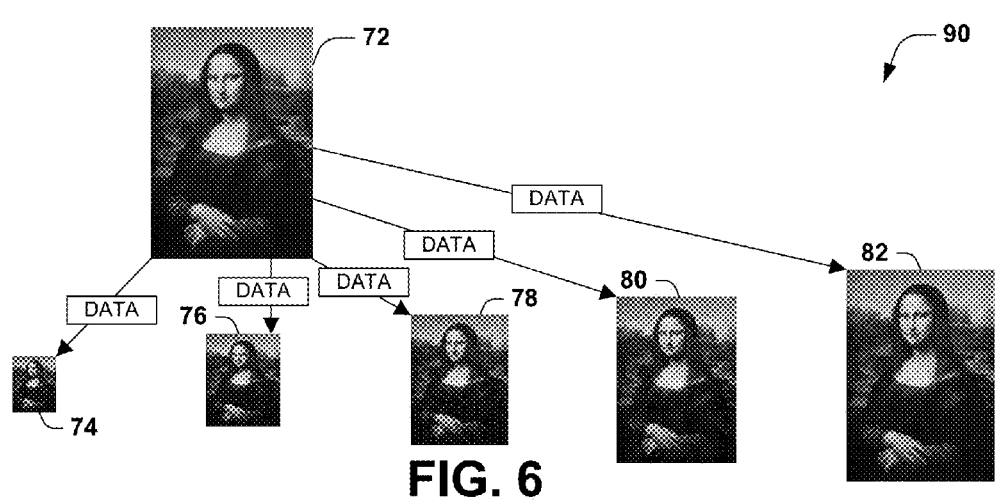
FIG. 6 is an illustration of an image scaling problem involving resampling of images following a provision of a first down-sampled image.

FIG. 6 illustrates a second example 80 wherein the loss of image quality is alleviated by generating a newly down-sampled image from the original full-size image 72 for different zoom levels. However, if a user who is viewing a small image instance 74 wishes to view a medium-size image 78, it may be inefficient to resample the entire full-size image 72 to the medium-size image 78 and to deliver the medium-size image 78 to the user, because the computer system of the user already has some of the image information in the small image instance 74. This resampling inefficiency may be particularly significant where the user wishes to resample an image many times, and where the sampling differences between a first version of the image and a second version of the image are very small (e.g., where the user wishes to zoom in from a 20% down-sampled image to a 21% down-sampled image.)

Figure 7:
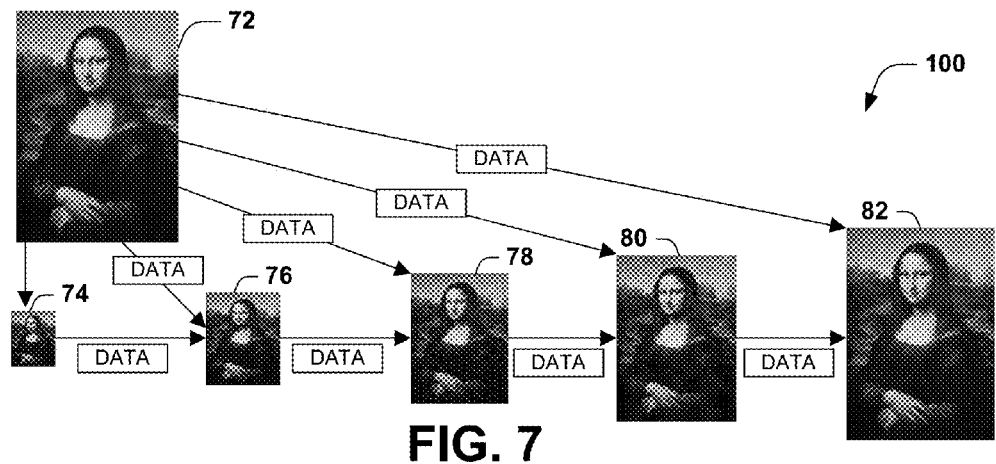
FIG. 7 is an illustration of a smoothly zoomable image scaling technique involving the provision of differential information following a provision of a first down-sampled image.

Because this resampling inefficiency may arise in many contexts, techniques have been devised to facilitate a differential provision of image information from a lower-sampled version of an image to a higher-sampled version of the image. When the user is provided with a first downsampled image, such as a small image instance 74, requests an up-sampled image (such as to zoom in on the image), rather than generating and sending a wholly resampled image as in FIG. 6, the computer system hosting the image may generate and send only the additional information that might be included in the up-sampled image but that is not present in the down-sampled image. FIG. 7 illustrates this technique in an exemplary scenario 100 wherein a user zooms in on a 74 small image instance through a series of zoom and scaling levels. If the user is viewing the small image instance 74 and zooms in to produce a somewhat larger image instance 76, the user may simply be sent a small amount of differential image information to supplement the information already present in the small image instance 74. The differential image information may then be combined with the information in the small image instance 74 to produce a version of the somewhat larger image instance 76 with a full amount of information that may be included within its image resolution limits. This differential computation and delivery of information may continue as the user continues to up-scale and zoom in on the image, even until the user is viewing a full-size image 82 containing all of the image information included in the original full-size image 72.

This differential image information technique, such as illustrated in FIG. 7, may facilitate the viewing of images at multiple zoom levels. As one example, the re-use of down-sampled information in this technique reduces the computational burden of resampling the original full-size image 72 for respective scaling and zoom levels. Moreover, by reducing the network transport costs of delivering downsampled images (especially at large zoom states near the dimensions of the original image, wherein such downsampled images may be very large), this technique may permit more rapid rendering of different zoom states of the image, which may permit the presentation of a smoothly zoomable image, which may be readily viewed at any zoom state by the user.

As an additional variation of this aspect, the user actions with respect to zooming into and out of images may be indicative of the relevance of the image with respect to the query. As discussed with respect to variations of the first aspect, and as illustrated in FIG. 4, images in the image store may be related to various query terms with a preassigned query term relevance score, which is assigned to respective images with respect to relevant query terms. Moreover, the zooming actions of the user may be evaluated with regard to the apparent relevance of the image to the query terms; e.g., if a user opts to zoom in on a first image and does not opt to zoom in on a second image, the query term relevance scores for the first image may be increased, and/or the query term relevance scores for the second image may be decreased. Accordingly, in some embodiments of these techniques involving smoothly zoomable image instances, upon detecting a user zoom action relating to a zoomed image instance in the image instance set, at least one query term relevance score in the image store relating the zoomed image instance to at least one query term may be adjusted in response to the user zoom action.

A third aspect that may vary among embodiments of these techniques relates to an adjustment of the scaling of image instances based on factors other than the query relevance score of the image. Such adjustments may sometimes be desirable, e.g., in view of the nature of the images comprising the query result set or the anticipated uses of the image instance set. As a first variation, the images selected from the image store may all compute to relatively low relevance scores, such as where the query includes query terms that rarely coincide (e.g., "Eiffel Tower elephant rocket".) All resulting image instances may have low query relevance scores, but it may be desirable to present those with the highest scores at a reasonably viewable scaling (e.g., at least 80%.) Conversely, a query comprising common query terms (e.g., "Eiffel Tower Seine River") may generate a large number of images with high query relevance scores, and it may be desirable to rescale the image instances to differentiate the high-scoring image instances from the low-scoring image instances (e.g., by adjusting scaling factors of image instances with scaling factors of 80% down to 50%, and adjusting higher-scoring scaling factors proportionally up to non-adjusted image instances having a 100% query relevance score.) Accordingly, some embodiments of these techniques may involve generating an image instance scaled proportionally to the query relevance score of the image and relative to the query relevance scores of other selected images. For example, after query relevance scores are calculated for all selected images, the frequency spectrum of the query relevance scores may be evaluated in order to select an adjustment factor that is subsequently applied to the query relevance scores of the selected images before generating image instances.

Figure 8:
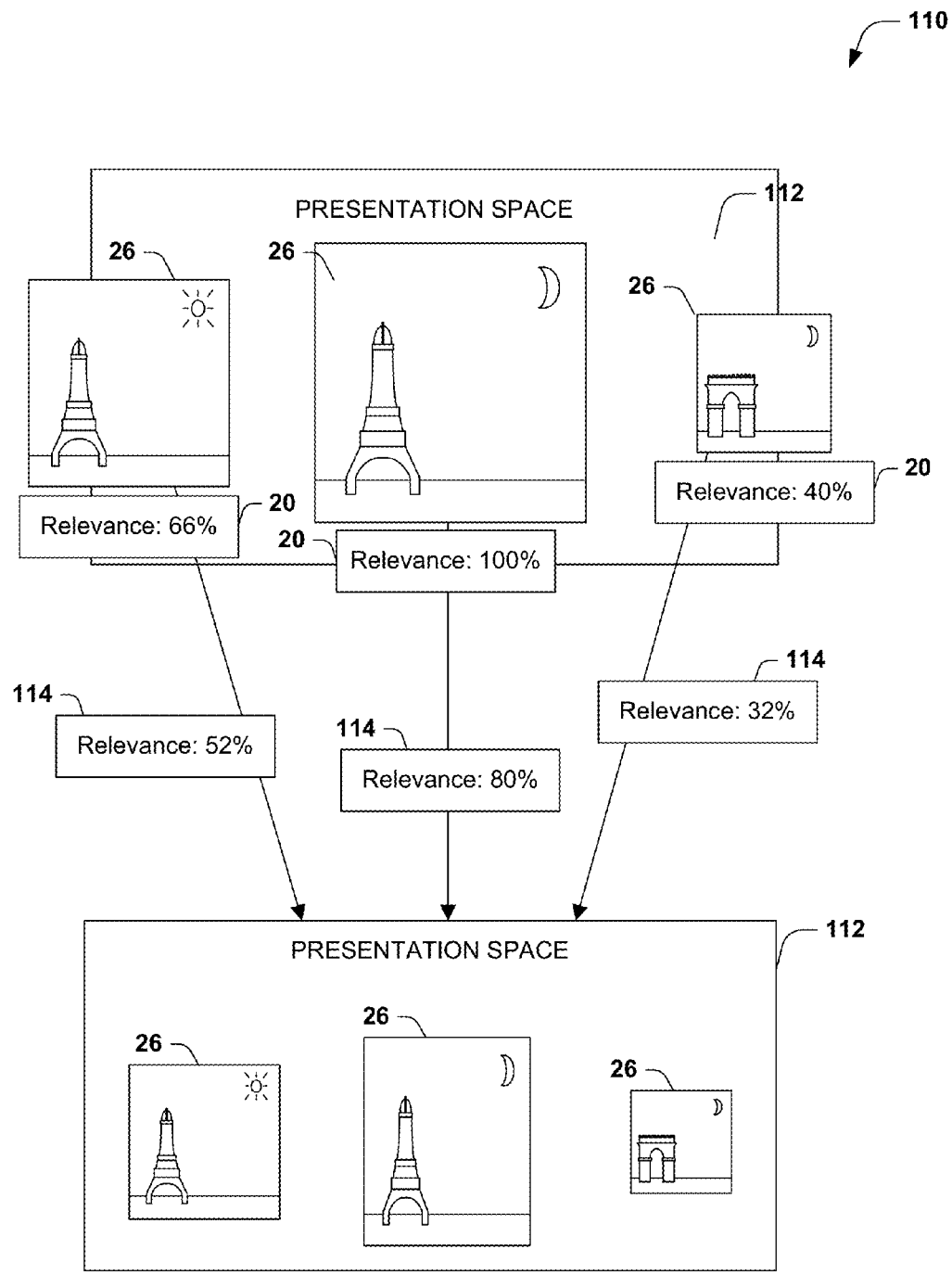
FIG. 8 is an exemplary illustration of an adjustment of relevance-relative scaling of image instances with respect to the dimensions of an image instance set presentation space.

FIG. 8 illustrates a second variation of this third aspect, wherein the image instance set presented in response to the query may be restricted to a presentation space of limited dimensions. As one example, the image instances may be displayed in a particular region of a webpage with rigid dimensions. In the scenario 110 illustrated in FIG. 8, the presentation space 112 for the images is inadequate to accommodate the image instances 26 scaled only according to the query relevance scores 20. In such scenarios, the scaling of the image instances may be adjusted to utilize but not exceed the presentation space. For example, the dimensions of the layout of the image instances within the image instance set may be computed and compared with the dimensions of the presentation space. In FIG. 8, the width of the image instance set exceeds the width of the presentation space 112 by 25%, so the query relevance scores 20 of the image instances 26 may be reduced to 80% of the computed value, such that the generated image instances 26 are scaled according to the adjusted query relevance scores 114 to fit within the presentation space 112. This adjusting may be achieved by resampling the image instances after the generating, but may be more efficiently achieved by adjusting the query relevance scores prior to generating the image instances. Accordingly, in some embodiments of these techniques where the presenting is restricted to a presentation space, the generating may involve scaling an image instance proportionally to the query relevance score of the image and relative to at least one dimension of the presentation space. Those of ordinary skill in the art may be able to devise many techniques for adjusting the scaling of images in relation to various factors other than the query relevance scores of the images while implementing the techniques discussed herein.

Figure 9:
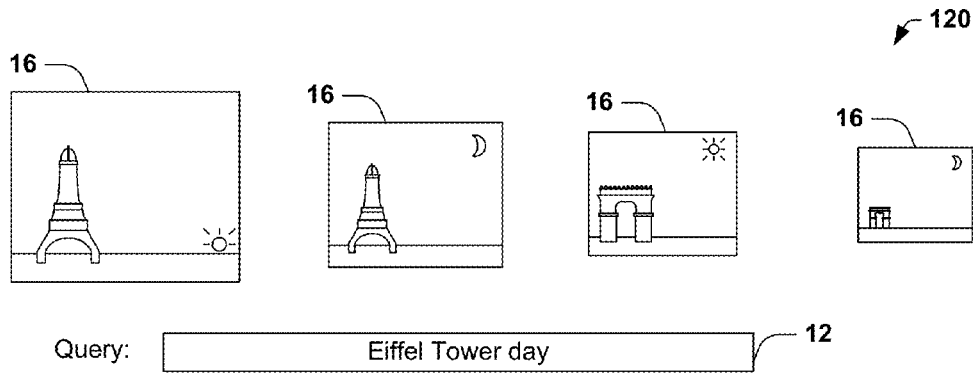
FIG. 9 is an illustration of an exemplary positioning of image instances in an image instance set.
Figure 10:
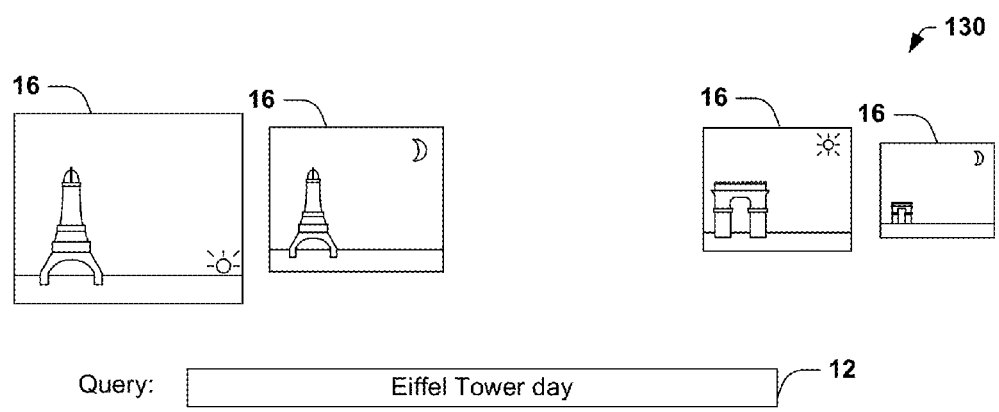
FIG. 10 is an illustration of another exemplary positioning of image instances in an image instance set.
Figure 11:
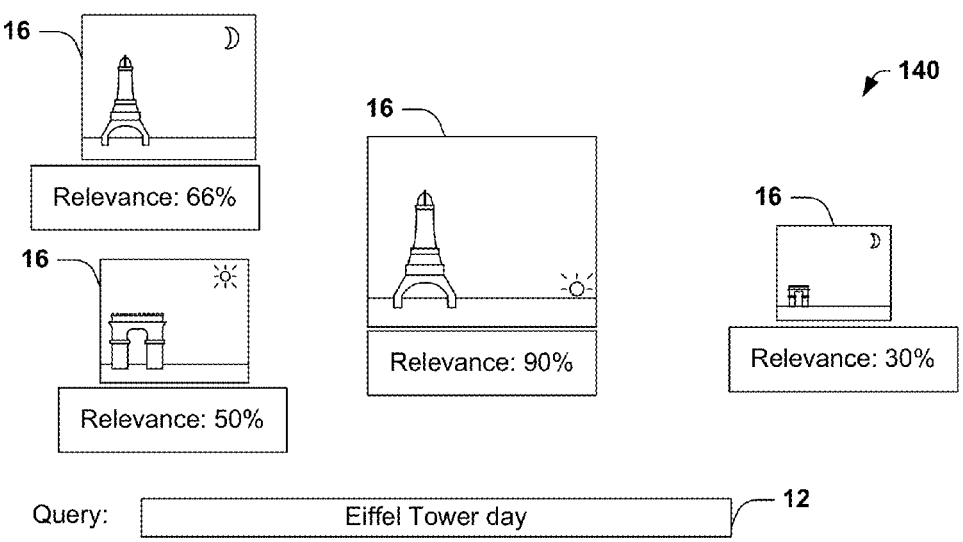
FIG. 11 is an illustration of yet another exemplary positioning of image instances in an image instance set.

A fourth aspect that may vary among implementations relates to the layout of the image instances within the image instance set. In many querying scenarios, query results are presented in order of decreasing relevance, and are presented in a vertical and/or horizontal ordering reflecting such relevance among the query results. For example, a website search often produces a list of links to relevant website organized in a vertical ordering of diminishing predicted relevance to the query. In these techniques, image instances in an image instance set presented in response to a query may be organized according to the query relevance of the images, e.g., in a horizontal and/or vertical ordering of decreasing query relevance scores. FIGS. 9-11 illustrate three arrangements of image instances in an image instance set based on various criteria. These figures illustrate an image instance set generated in response to an "Eiffel Tower day" query, wherein the selected images include a very relevant image of the Eiffel Tower at sunset; a less relevant image of the Eiffel Tower at night; an even less relevant image of the Arc de Triomphe during the day; and a low-relevance image of the Arc de Triomphe at night. As a first example, in the exemplary image instance set 120 of FIG. 9, the image instances are horizontally positioned in order of to decreasing query relevance. However, because the query relevance is denoted by the scaling of the image instances, positionings are also feasible that are spatially related to an order of query relevance.

FIG. 10 illustrates a second example 130, wherein the image instances 16 are clustered according to the relatedness of the images, wherein a first cluster of images comprises the images of the Eiffel Tower, which are spatially separate from a second cluster of images comprising the images of the Arc de Triomphe. Accordingly, in some embodiments of these techniques, the preparing may involve positioning the image instance of respective selected images nearer image instances of related selected images. In this variation, the horizontal positioning may still reflect an ordering of the image instances by query relevance, but the positioning may be adjusted based on other factors.

FIG. 11 illustrates a third example 140, wherein the image instances 16 are clustered according to similar query relevance scores, wherein medium-relevance images are presented as a cluster in the left portion of the image instance set, a high-relevance image is presented in the center of the image instance set, and a low-relevance image is presented in the right portion of the image instance set. Accordingly, in some embodiments of these techniques, the preparing may involve positioning the image instance of respective selected images nearer image instances of selected images having a similar query relevance score. It is noteworthy that in this third example 140, the horizontal ordering of the image instances does not reflect the query relevance of the image instances; rather, the spatial layout may arbitrarily chosen based on any desirable factor. As an additional variation (not shown) of this aspect, where the query comprising at least two query terms, the positioning may reflect clusterings of images having a similar query relevance score for respective query terms; e.g., image instance reflecting a correct subject (e.g., the Eiffel Tower) but at incorrect times of day (e.g., at twilight and midnight) may be positioned in a first cluster, and image instances reflecting an incorrect but related subject (e.g., the Arc de Triomphe and the Louvre) but at the correct time of day (e.g., in the daytime.) Those of ordinary skill in the art may choose to arrange image instances scaled according to query relevance in many ways while implementing the techniques discussed herein.

A fifth aspect that may vary among implementations of these techniques relates to the presentation of the image instances with respect to the images represented by the query results. As one example, the presenting may involve associating respective image instances with the image in the image store. As one example, the image instance may be associated with a URI hyperlink where the full-size image from which the image instance derived may be viewed. Thus, if the image instance set is presented to a user in a web browser, the user may click on an image instance to view the original, full-size image. As a second example, if respective image instances are associated with a non-image data record in a data store (e.g., a person record in a Contacts database), the image instance may be associated with the record, such as through a relational data query (e.g., an SQL query) that may be executed against the data store to retrieve the data record represented by the image instance. Those of ordinary skill in the art may devise many associations of image instances with represented images and data items while implementing the techniques discussed herein.

A sixth aspect that may vary among implementations of these techniques relates to the context in which the query is evaluated. In one such context, the query is received from a user, and the presenting may comprise sending the image instance set to the user. For example, the user may issue a query to a server through a client terminal, and the query may be evaluated by a server against the image store and returned to the client. In an alternative context, the query may be generated by a computer system, such as an automated query routinely generated to synchronize two data stores. This context may be applicable to large data stores with highly dynamic content, such as news servers or often-updated image servers, and the query relevance may be representative of the priority of the associated data items (e.g., the significance of a news item or the quality of an image) in order to organize the order of retrieved items from a large data store. For example, if images representing news stories are clustered according to importance and also according to the underlaying news story, then the techniques discussed herein may be utilized during an automated query such that at least a few of the most significant images and associated data items are first retrieved, and then some of the moderately less significant images and associated data items are next retrieved, even if additional images of the same high-significance data item are available. Hence, the relevance-relative image instance scaling techniques discussed herein may be advantageously applied in automated queries to adjust the prioritization of the data items selected in response to the query. Those of ordinary skill in the art may apply the techniques discussed herein to many such contexts.

Figure 12:
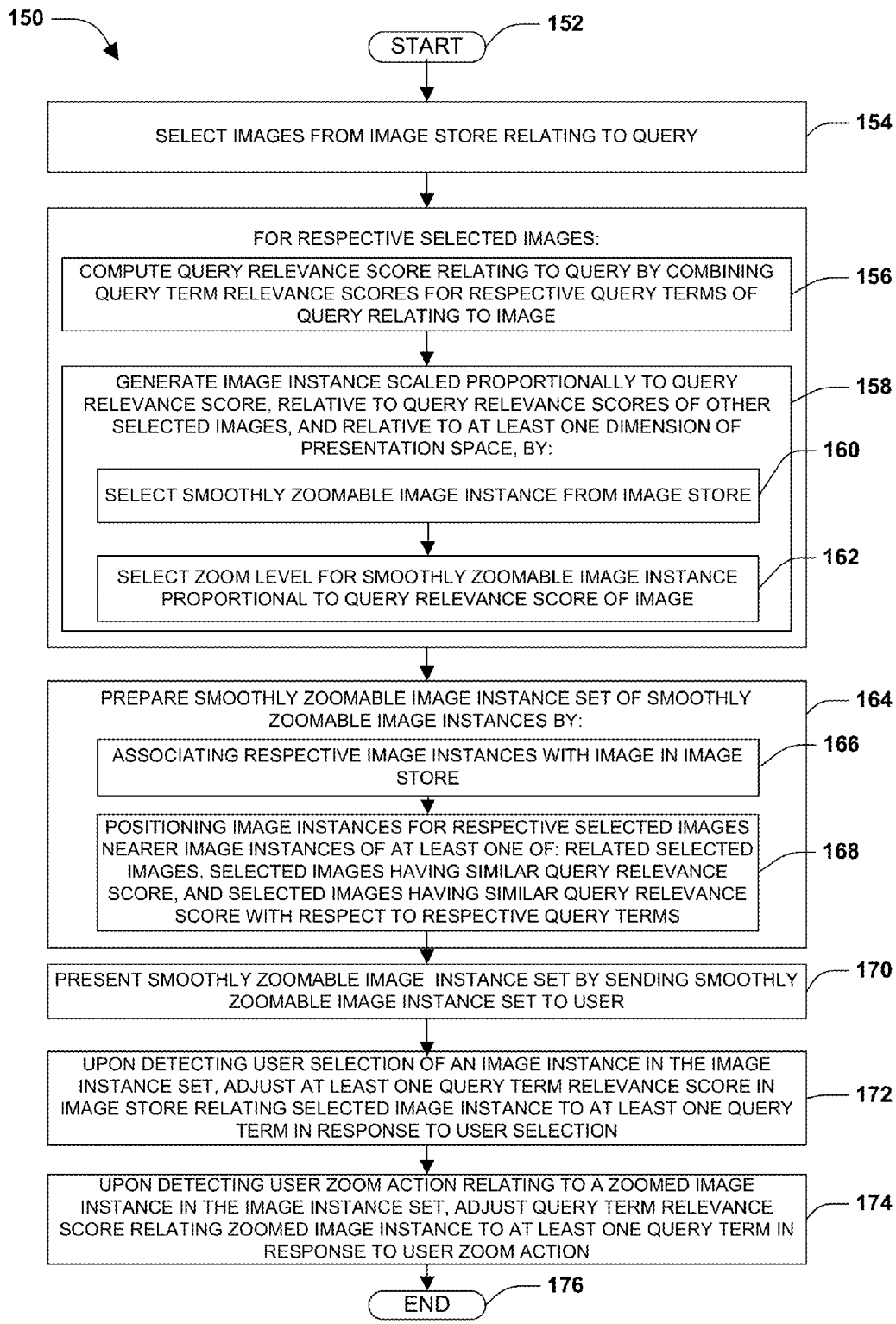
FIG. 12 is a flow chart illustrating another exemplary method of presenting images selected from an image store in response to a query.

The variations of the aspects discussed hereinabove may also be implemented in combination with other variations of these aspects. The resulting embodiment may therefore exhibit several advantages and/or a reduction of several disadvantages as discussed heretofore. One such combination embodiment is illustrated in FIG. 12, illustrating an exemplary method 150 method of presenting images selected from an image store and relating to a query comprising at least one query term and received from a user. The exemplary method 150 may be applied to an image store comprising smoothly zoomable images, and having at least one query term relevance score relating the respective image to at least one query term. The images of the image store are therefore presented as image instances scaled according to the predicted relevance of the respective image to the query, and positioned within a presentation space.

The exemplary method 150 begins at 152 and involves selecting 154 images from the image store relating to the query. The exemplary method 150 also involves, for respective selected images, computing 156 a query relevance score relating to the query by combining the query term relevance scores for respective query terms of the query relating to the image. The exemplary method 150 also involves generating 158 an image instance scaled proportionally to the query relevance score, relative to the query relevance scores of other selected images, and relative to at least one dimension of the presentation space, by selecting 160 a smoothly zoomable image instance from the image store, and by selecting 162 a zoom level for the smoothly zoomable image instance proportional to the query relevance score of the image. The exemplary method 150 also involves preparing 164 a smoothly zoomable image instance set of smoothly zoomable image instances. The preparing 164 may involve associating 166 respective image instances with the image in the image store. The preparing 164 may also involve positioning 168 the image instances for respective selected images nearer image instances of at least one of related selected images, selected images having a similar query relevance score, and selected images having a similar query relevance score with respect to respective query terms.

After preparing 164 the smoothly zoomable image instance set, the exemplary method 150 involves presenting 170 the smoothly zoomable image instance set by sending the smoothly zoomable image instance set to the user. The exemplary method 150 may also involve, upon detecting a user selection of a selected image instance in the image instance set, adjusting 172 at least one query term relevance score in the image store relating the selected image instance to at least one query term in response to the user selection. The exemplary method 150 may also involve, upon detecting a user zoom action relating to a zoomed image instance in the image instance set, adjusting 174 the query term relevance score in the image store relating the zoomed image instance to at least one query term in response to the user zoom action. Having presented to the user a smoothly zoomable image instance set where respective images are scaled proportionally to the predicted relevance of the associated image with the query, the exemplary method 150 thereby achieves a representation of the images of the image store with a relevance-relative scaling, and so ends at 176.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
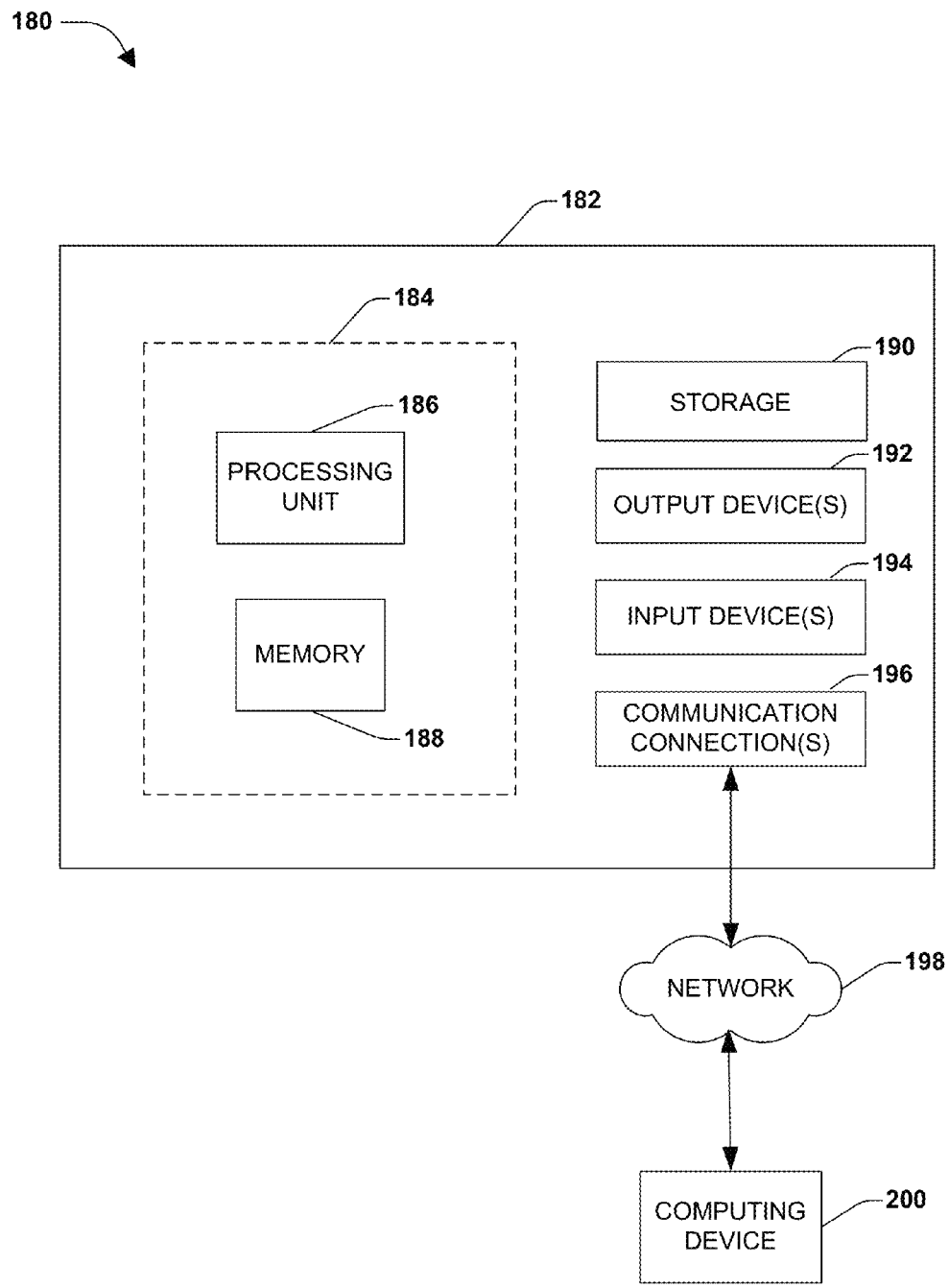
FIG. 13 is a component block diagram illustrating an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 180 comprising a computing device 182 configured to implement one or more embodiments provided herein. In one configuration, computing device 182 includes at least one processing unit 186 and memory 188. Depending on the exact configuration and type of computing device, memory 188 may be volatile (such as RAM, for example), non-volatile (such as ROM, flash memory, etc., for example) or some combination of the two. This configuration is illustrated in FIG. 13 by dashed line 184.

In other embodiments, device 182 may include additional features and/or functionality. For example, device 182 may also include additional storage (e.g., removable and/or non-removable) including, but not limited to, magnetic storage, optical storage, and the like. Such additional storage is illustrated in FIG. 13 by storage 190. In one embodiment, computer readable instructions to implement one or more embodiments provided herein may be in storage 190. Storage 190 may also store other computer readable instructions to implement an operating system, an application program, and the like. Computer readable instructions may be loaded in memory 188 for execution by processing unit 186, for example.

The term "computer readable media" as used herein includes computer storage media. Computer storage media includes volatile and nonvolatile, removable and non-removable media implemented in any method or technology for storage of information such as computer readable instructions or other data. Memory 188 and storage 190 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 182. Any such computer storage media may be part of device 182.

Device 182 may also include communication connection(s) 196 that allows device 182 to communicate with other devices. Communication connection(s) 196 may include, but is not limited to, a modem, a Network Interface Card (NIC), an integrated network interface, a radio frequency transmitter/receiver, an infrared port, a USB connection, or other interfaces for connecting computing device 182 to other computing devices. Communication connection(s) 196 may include a wired connection or a wireless connection. Communication connection(s) 196 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 182 may include input device(s) 194 such as keyboard, mouse, pen, voice input device, touch input device, infrared cameras, video input devices, and/or any other input device. Output device(s) 192 such as one or more displays, speakers, printers, and/or any other output device may also be included in device 182. Input device(s) 194 and output device(s) 192 may be connected to device 182 via a wired connection, wireless connection, or any combination thereof. In one embodiment, an input device or an output device from another computing device may be used as input device(s) 194 or output device(s) 192 for computing device 182.

Components of computing device 182 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 182 may be interconnected by a network. For example, memory 188 may be comprised of multiple physical memory units located in different physical locations interconnected by a network.

Those skilled in the art will realize that storage devices utilized to store computer readable instructions may be distributed across a network. For example, a computing device 200 accessible via network 198 may store computer readable instructions to implement one or more embodiments provided herein. Computing device 182 may access computing device 200 and download a part or all of the computer readable instructions for execution. Alternatively, computing device 182 may download pieces of the computer readable instructions, as needed, or some instructions may be executed at computing device 182 and some at computing device 200.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting images selected from an image store in response to a query, the method comprising:
    selecting images from the image store relating to the query;
    for respective selected images:
        computing a query relevance score relating to the query, and
        generating a first image instance scaled at a first zoom level that is proportional to the query relevance score;
    preparing an image instance set of scaled first image instances;
    presenting the image instance set; and
    upon detecting a user selection of a selected image instance in the image instance set:
        selecting a second zoom level for the selected image instance that is greater than the first image instance;
        requesting a differential image data set supplementing the first image instance at the first zoom level to a second image instance at the second zoom level; and
        upon receiving the differential image data set, presenting the second image instance comprising the first image instance supplemented with the differential image data set.

2. The method of claim 1:
the image store comprising, for respective images, a query term relevance score relating the image to a query term;
the query comprising at least one query term; and
the computing comprising: combining the query term relevance scores for respective query terms of the query relating to the image.

3. The method of claim 2:
the preparing comprising: preparing an image instance set of arbitrarily zoomable image instances; and
the method comprising: upon detecting a user zoom action relating to a zoomed image instance in the image instance set, adjusting the query term relevance score in the image store relating the zoomed image instance to at least one query term in response to the user zoom action.

4. The method of claim 1:
the image store comprising, for respective images, a scaled image instance series; and
the generating comprising: selecting a scaled image instance from the scaled image instance series in the image store scaled proportionally with respect to the query relevance score of the image.

5. The method of claim 1, the preparing comprising:
preparing an arbitrarily zoomable image instance set of arbitrarily zoomable image instances.

6. The method of claim 5:
the image store comprising, for respective images, an arbitrarily zoomable image instance; and
the generating comprising:
    selecting the arbitrarily zoomable image instance from the image store, and
    selecting a zoom level for the arbitrarily zoomable image instance proportional to the query relevance score of the image.

7. The method of claim 1, the generating comprising:
generating an image instance scaled proportionally to the query relevance score of the image and relative to the query relevance scores of other selected images.

8. The method of claim 1:
the presenting restricted to a presentation space, and
the generating comprising: generating an image instance scaled proportionally to the query relevance score of the image and relative to at least one dimension of the presentation space.

9. The method of claim 1, the preparing comprising: for respective selected images, positioning the image instance of the image nearer image instances of related selected images.

10. The method of claim 1, the preparing comprising: for respective selected images, positioning the image instance of the image nearer image instances of selected images having a similar query relevance score.

11. The method of claim 10:
the query comprising at least two query terms, and
the preparing comprising: for respective selected images, positioning the image instance of the image nearer selected images having a similar query relevance score for respective query terms.

12. The method of claim 1, the preparing comprising:
associating respective image instances with the image in the image store.

13. A system for presenting images selected from an image store in response to a query, the system comprising:
    an image selecting component configured to select images from the image store relating to the query;
    an image query relevance score computing component configured to, for respective selected images, compute a query relevance score relating to the query;
    an image instance generating component configured to, for respective selected images:

generate a first image instance of the image scaled at a first zoom level proportional to the query relevance score; and
upon receiving a request to generate a differential image data set supplementing the first image instance at the first zoom level to a second image instance at the second zoom level, provide the differential image data set for the selected image instance;
an image instance set preparing component configured to prepare an image instance set of image instances; and
an image instance set presenting component configured to:
present the image instance set of the first image instances, and
upon receiving a selection of a selected image:
selecting a second zoom level for the selected image instance that is greater than the first image instance;
requesting from the image instance generating component a differential image data set supplementing the first image instance at the first zoom level to a second image instance at the second zoom level; and
upon receiving the differential image data set, presenting the second image instance comprising the first image instance supplemented with the differential image data set,
at least one component comprising a set of software instructions stored in a memory of a device and executable on a processor of the device.

14. The system of claim 13:
the image store comprising, for respective images, a query term relevance score relating the image to a query term;
the query comprising at least one query term; and
the image query relevance score computing component configured, for respective selected images, to combine the query term relevance scores for respective query terms of the query relating to the image.

15. The system of claim 13, the image instance set preparing component configured to prepare an arbitrarily zoomable image set of arbitrarily zoomable image instances.

16. The system of claim 15:
the image store comprising, for respective images, an arbitrarily zoomable image instance; and
the image instance generating component configured to:
select the arbitrarily zoomable image instance from the image store, and
select a zoom level for the arbitrarily zoomable image instance proportional to the query relevance score of the image.

17. The system of claim 13:
the presenting restricted to a presentation space, and
the image instance generating component configured to generate an image instance scaled proportionally to the query relevance score of the image and relative to at least one dimension of the presentation space.

18. The system of claim 13, the image instance set presenting component configured to, for respective selected images, position the image instance of the image nearer image instances of related selected images.

19. The system of claim 13, the image instance set presenting component configured to, for respective selected images, position the image instance of the image nearer image instances of selected images having a similar query relevance score.

20. A method of presenting images in a presentation space selected from an image store comprising arbitrarily zoomable images and at least one query term relevance score relating the image to at least one query term in response to a query received from a user comprising at least one query term, the method comprising:
selecting images from the image store relating to the query;
for respective selected images:
computing a query relevance score relating to the query by combining the query term relevance scores for respective query terms of the query relating to the image, and
generating an image instance scaled proportionally to the query relevance score, relative to the query relevance scores of other selected images, and relative to at least one dimension of the presentation space, by:
selecting an arbitrarily zoomable image instance from the image store, and
selecting a zoom level for the arbitrarily zoomable image instance proportional to the query relevance score of the image;
preparing an arbitrarily zoomable image instance set of arbitrarily zoomable image instances by:
associating respective image instances with the image in the image store, and
placing image instances for respective selected images nearer image instances of at least one of:
related selected images,
selected images having a similar query relevance score, and
selected images having a similar query relevance score with respect to respective query terms;
presenting the arbitrarily zoomable image instance set by sending the arbitrarily zoomable image instance set to the user;
upon detecting a user selection of a selected image instance in the image instance set, adjusting at least one query term relevance score in the image store relating the selected image instance to at least one query term in response to the user selection; and
upon detecting a user zoom action relating to a zoomed image instance in the image instance set, adjusting the query term relevance score in the image store relating the zoomed image instance to at least one query term in response to the user zoom action.

* * * * *